Sept. 26, 1967 F. M. BOWERS ET AL 3,343,992
SILVER CHLORIDE-MAGNESIUM SEA WATER BATTERY
Filed Nov. 2, 1962
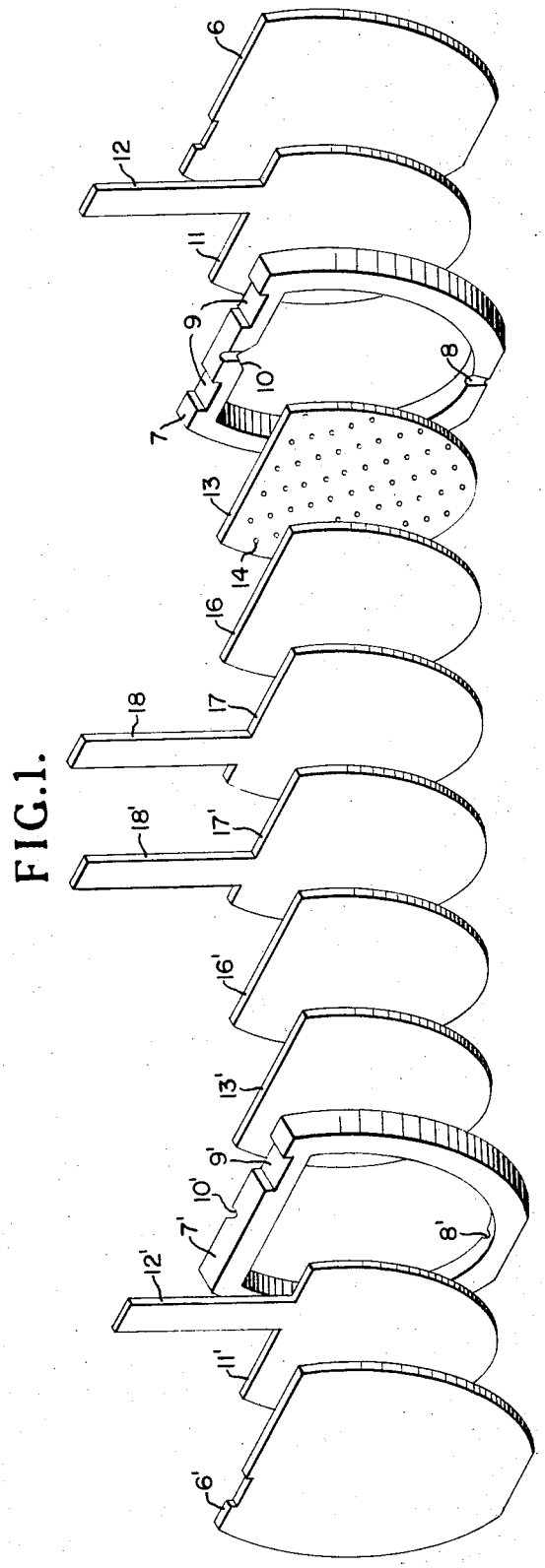
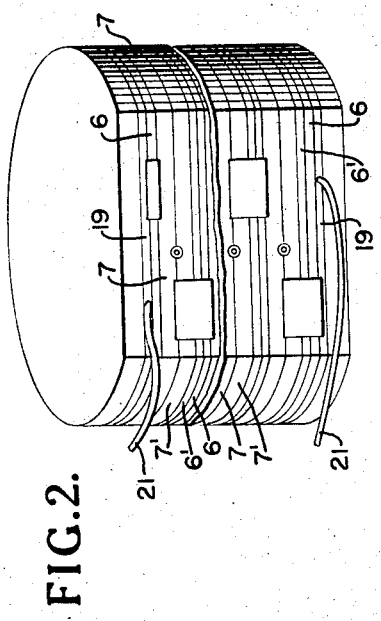
INVENTOR
FREDERIC M. BOWERS
DANIEL DENEGALL
BY *Hodges* ATTY.
*Frank D. Nieman* AGENT.

United States Patent Office 3,343,992
Patented Sept. 26, 1967

3,343,992
SILVER CHLORIDE-MAGNESIUM SEA WATER BATTERY
Frederic M. Bowers, Silver Spring, Md., and Daniel Denegall, Washington, D.C., assignors to the United States of America as represented by the Secretary of the Navy
Filed Nov. 2, 1962, Ser. No. 235,163
1 Claim. (Cl. 136—90)

The invention described herein may be manufactured and used by or for the Government of the United States of America for governmental purposes without the payment of any royalties thereon or therefor.

This invention relates to a battery and more particularly to a new and improved silver chloride, magnesium, sea water battery.

Although sea water batteries have been utilized for several years, a constant problem has been plaguing the users of these batteries in that a random voltage modulation or fluctuation is generated within the battery which adversely affects much of the electronic equipment utilized in conjunction with the battery. For example, this voltage fluctuation or modulation produces considerable static in sonobuoy transmitters when they are powered by sea water batteries.

The general purpose of the present inventions is to provide a new and improved sea water battery which produces, by decreasing the parasitic capacity drain to the surrounding electrolyte medium and by increasing the rate of elimination of waste products and generated gas through the use of a novel shape and arrangement of the elements within the battery, more electrical power output per area of generating electrodes and generating less random voltage modulation.

An object of the present invention is to provide a greater electrical power output per unit area having less random voltage modulation to produce static noise in the associated electronic equipment by a new and improved combination of elements.

Another object is to reduce the capacity drain through the surrounding medium by restricting the cross-sectional area of the entry and exit ports to the minimum size.

A further object is to increase the efficiency of the electrolyte circulation by minimizing formation of gas pockets in order to improve the discharge of waste and gaseous byproducts.

With these and other objects in view, as will hereinafter more fully appear, and which will be more particularly pointed out in the appended claims, reference is now made to the following description taken in connection with the accompanying drawing in which:

FIG. 1 is an exploded view of a typical cell;
FIG. 2 is a side view of several cells connected together to form a battery.

FIG. 1 illustrates the components of an individual cell showing two end plates 6 and 6' made of a suitable insulator such as a plastic or a thermo-plastic methyl methacrylate resin or polystyrene-acrylonitrile-butadiene-styrene or an ABS polymer which are bonded or attached to holders 7 and 7' respectively, of the same material as the end plates. The holders 7 and 7' have a peripheral surface which is generally cylindrical with the exception of two parallel truncated portions. The interior portion thereof has a truncated portion parallel to the one exterior truncated portion while the remainder of the interior portion is in the form of a cylinder. In the center of the two truncated exterior surfaces are two half-holes 8, 8' and 10, 10' which connect the exterior surface with the interior surface and on the interior surface are formed with divergently tapered sidewalls, with the bottom half-holes 8 and 8' being smaller than the top half-holes 10 and 10'. In the top portion of the holders there are a plurality of slots 9 and 9' cut into the outer surface of the holders to permit the cells to be mechanically connected together by recession and insulation of intercell connectors (not shown). Immediately adjacent the interior surface of the ends 6 and 6' are metallic conductors 11 and 11' which are preferably constructed of a thin sheet of silver foil having tabs 12 and 12' extending therefrom. Also contained entirely within the holders is a pair of silver chloride cathodes 13 and 13' having one surface completely in contact with one surface of the silver foil metallic conductors 11 and 11' respectively and conforming in shape to the interior shape of the holders 7 and 7'. On the other side of the silver chloride cathodes and embedded therein are a plurality of tiny glass beads 14 which protrude from the surface a small distance. A pair of magnesium anodes 16 and 16' are contained within the holders 7 and 7' and have one surface in contact with the glass beads 14 embedded within the silver chloride cathodes 13 and 13' so that the magnesium anodes and the silver chloride cathodes are separated by a small distance of the order of .015 inch. On the other side of the magnesium anodes 16 and 16' are a pair of metaillic conductors 17 and 17' similar to the metallic conductor 11 having tabs 18 and 18' protruding from the truncated portion of the circular disc section. Two separate conductors are shown, but one will suffice, since this reduces the number of different elements required to be produced in mass production technique. The elements enumerated form two parallel and distinct cells (distinguished by the prime marks on the numerals) of a particular section of the battery with the two cells being identical in structure to each other. The two cells are placed so that the magnesium anodes 16 and 16' sandwich between them a pair of metallic conductors 17 and 17' and in a like manner the other elements are placed in a similar position. The holes 8 and 8' in the holders 7 and 7' are only a half a hole in each side of the holders 7 and 7' so that upon joining the two together they form one circular hole.

FIG. 2 illustrates the manner in which a plurality of the battery cells of FIG. 1 can be joined together to form an operative battery in which each cell actually comprises two individual cells in parallel. The tabs 12 and 12' are joined together within the cell to connect the cells in parallel. The external connections, covered with a suitable potting and insulating material, joining the cells of FIG. 1 in series are shown in FIG. 2. The end cells are connected to silver plated brass discs 19 in the same manner that the cells are connected in series. Attached to the discs 19 are wires 21 to carry the electrical power produced by the battery to an external load (not shown). An insulative covering of the same material as the holders 7 (FIG. 1) forms an end plate and is joined to the ends 6 to completely enclose and insulate all conductive materials of the battery from the external surrounding conductive sea water.

In operation the sea water battery is activated upon the entrance of the sea water electrolyte through the holes 8, 8' and 10, 10' in the holders 7 and 7' of the battery and when activated the battery produces a hydrogen gas and magnesium hydroxide from the magnesium anodes as waste products. The magnesium anodes are placed in the center of the cell with the holes in the holders 7 and 7' directly above and below the magnesium anodes 16 and 16' so that the water entering the cell goes directly over the anodes and helps to wash away the waste products. The circular shape of the battery on the interior produces a more even distribution of the sea water electrolyte so that the anodes and cathodes in the corners are supplied with fresh electrolyte which helps not only to prolong the life but to produce more power from the battery. The spacing between the anodes and the cathodes 13, 16 and 13', 16' respectively, is maintained by the tiny glass beads 14 and is very small so that no evacuated pockets containing gas are formed and also so the hydrogen gas bubbles formed on the anode will be displaced rapidly and carry away with them the insoluble magnesium hydroxide generated by the chemical reaction. The holes in the top and bottom 10, 10' and 8, 8', respectively, of the holders 7 and 7' are quite small with the bottom hole 8 and 8' being the smaller of the two holes, so that the parasitic drain through the surrounding external sea water electrolyte is negligible and the holes are sized to supply only a sufficient amount of sea water electrolyte to maintain the generation due to the chemical reaction as well as carry away the by products of the chemical reaction.

The circular shape of the discs as well as the housing holding the discs together with the very small spacing between the anode and the cathode in combination with the small holes to minimize the parasitic drain to the surrounding sea water electrolyte; plus the placing of a pair of anodes back-to-back in the center of the holder, have all contributed in aiding the maintenance of the sufficient fresh sea water electrolyte between the electrodes as well as carrying away the waste products. Consequently, the random voltage modulation has been substantially reduced. The electrical power output from a typical five cell battery, constructed in accordance with FIG. 2, in which the circular diameter is 2½ inches and the thickness of the encased battery is 1.375 inches has been in excess of 13 watt hours of electrical energy.

As has been pointed out, the combination of elements co-act together to produce a new and improved silver chloride magnesium, sea water battery wherein the voltage output is greater with no voltage modulation due to the novel combination of the elements.

Obviously many modifications and variations of the present invention are possible in the light of the above teachings. It is therefore to be understood, that within the scope of the appended claim the invention may be practiced otherwise than as specifically described.

What is claimed is:

A sea water battery comprising
(A) at least two flat thin disc magnesium anodes circular in shape and having a truncated top portion,
(B) at least one thin silver foil conductor of the same shape as said anodes positioned between and in physical and electrical contact with one surface of said magnesium anodes,
(C) at least two flat thin disc silver chloride cathodes of the same shape as said anodes and having one surface facing the other surface of said anodes,
(D) tiny glass bead means embedded in the one surface of each of said cathodes and in contact with the other surface of said anodes for maintaining electrical separation and circulating sea water electrolyte between said anodes and said cathodes and being of a sufficiently small size to prevent formation of gas pockets between said anodes and said cathodes,
(E) a pair of thin silver foil conductors having the same shape as said anodes and each being in physical and electrical contact with the other surface of one of said cathodes,
(F) insulation means for completely enclosing and insulating from the surrounding external sea water electrolyte all of the prior named elements (A, B, C, D, E) having an interior surface conforming in shape to said anodes,
(G) a first small aperture means positioned in the top truncated portion of said insulation means and centered over said anodes having divergingly tapered sidewalls the small diameter being on the exterior surface of said insulation means for passing therethrough spent sea water electrolyte and waste products from the chemical reaction within the sea water battery,
(H) a second aperture means smaller than and positioned in the bottom of said insulation means opposite said first aperture means and centered over said anodes having divergingly tapered sidewalls the smaller diameter being on the exterior surface of said insulation means for passing therethrough only a sufficient quantity of sea water to maintain the chemical reaction within the battery,
(I) and means connected to said silver foil conductor and to said pair of thin silver foil conductor to conduct the generated electrical power to an external load,
(J) whereby upon submergence of the sea water battery within a body of salt water the salt water enters and initiates the chemical reaction between said anodes and said cathodes to produce electrical energy and said first and said second apertures maintain the chemical reaction by carrying away the spent electrolyte and sea water and by supplying fresh sea water respectively and the shape of the interior of said insulation means provides a suitable path for maintaining fresh sea water electrolyte in contact with said anodes and said cathodes and said tiny glass beads maintain separation between said anodes and said cathodes as well as preventing formation of gas pockets.

References Cited

UNITED STATES PATENTS 2,988,587  6/1961  Haring _____ 136—90
3,100,164  8/1963  Solomon et al. _____ 136—90

WINSTON A. DOUGLAS, *Primary Examiner.*

MURRAY TILLMAN, *Examiner.*

B. J. OHLENDORF, A. SKAPARS, *Assistant Examiners.*